May 5, 1925.
P. C. SEEL
1,536,312
PROCESS OF RECOVERING ACETIC VALUES FROM A CELLULOSE ACETATE MIXTURE
Filed April 2, 1924
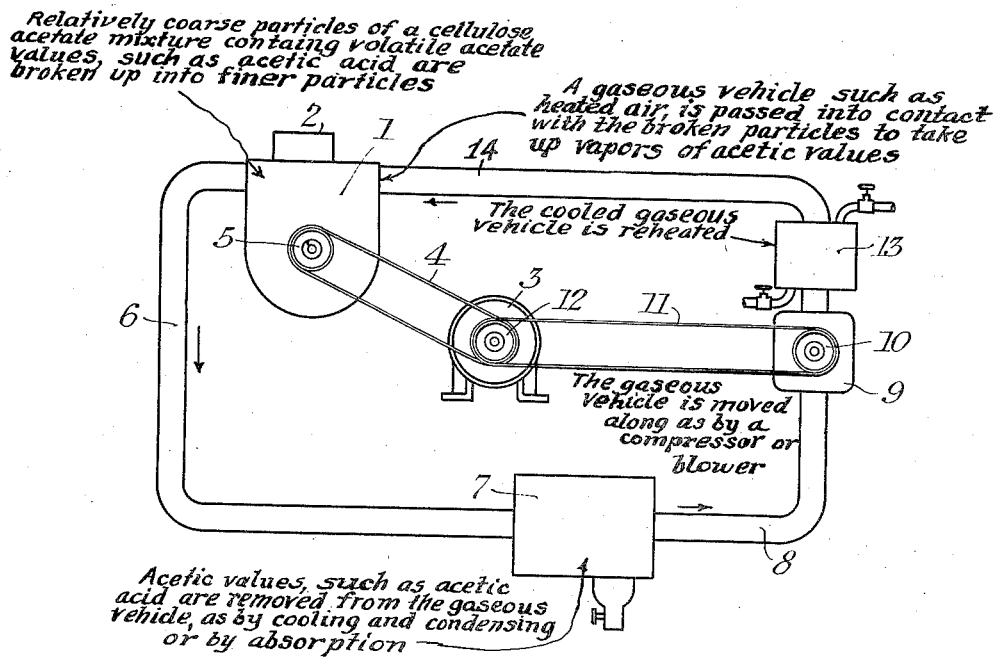
INVENTOR,
Paul C. Seel,
BY R. L. Stinchfield
ATTORNEY

Patented May 5, 1925.

1,536,312

UNITED STATES PATENT OFFICE.

PAUL C. SEEL, OF ROCHESTER, NEW YORK, ASSIGNOR TO EASTMAN KODAK COMPANY, OF ROCHESTER, NEW YORK, A CORPORATION OF NEW YORK.

PROCESS OF RECOVERING ACETIC VALUES FROM A CELLULOSE-ACETATE MIXTURE.

Application filed April 2, 1924. Serial No. 703,798.

*To all whom it may concern:*

Be it known that I, PAUL C. SEEL, a citizen of the United States of America, residing at Rochester, in the county of Monroe and State of New York, have invented certain new and useful Improvements in Processes of Recovering Acetic Values from a Cellulose-Acetate Mixture, of which the following is a full, clear, and exact specification.

This invention relates to processes for recovering acetic values from cellulose acetate mixtures. One object of the invention is to provide a process for recovering such values from such a mixture when the latter is already in the form of powdery grains, such as the intermediate product or powder produced in my prior Patent No. 1,494,816, granted May 20, 1924, for process of manufacturing cellulose acetate. Another object of the invention is to provide a rapid and inexpensive process for breaking up such powder and volatilizing acetic values therefrom. Other objects will hereinafter appear.

In the accompanying drawing, the single figure is a diagrammatic side elevation, partly in vertical section, showing one form of apparatus in which my process may be carried out, the relative sizes of the parts being exaggerated for the sake of clearness.

When a cellulose acetate reaction mixture containing initially cellulose, acetic anhydride, acetic acid and sulfuric acid, or some other well known condensing agent, is allowed to react and the excess of acetic values are evaporated, especially with agitation of the mass, there is produced a powder, the grains of which do not coalesce upon standing at room temperature and pressure. This may contain some residual acetic values, such as acetic acid or acetic anhydride or acetyl chloride, or mixtures of these; but such values are insufficient, at least on the surfaces of the grains, to make them clump together. In this way an intermediate product is formed which has a very large surface relative to its mass. Because of this, it may be rapidly treated with liquids and such treatment, moreover, will be uniform with respect to all the particles, thus insuring substantial homogeneity as a result of the treatment.

When the powdery mass is produced from the cellulose acetate reaction mixture, in which the cellulose acetate is in solution prior to the powder-forming operation, the drying out of the acetic values from the powdery grains may be carried to various degrees, so long as the great surface relative to the mass is maintained,—in other words, so long as the particles of the powder remain substantially separate. Because, however, of the difficulty of removing the last residual portions of acetic values from the powder by continued blowing in the apparatus described in my hereinabove cited application, it becomes advisable for economical reasons to carry the evaporation only down to the point where the acetic values form less than half of the weight of the powder. A powder in which 30% of the weight consists of acetic values is a typically useful one.

For some purposes it is desirable to free the cellulose acetate, even from these small residual acetic values. Moreover, it is desirable at the same time to recover such values economically. I have found that this can be done by breaking up the grains of powder into relatively finer particles, thereby exposing the interior portions of the particles, and permitting the acetic values to vaporize through the new surfaces thus formed. Preferably these vapors are taken up by a fluid vehicle and carried away, the values being finally extracted from the vehicle by absorption, condensation, or the like.

This method of treating the granular or powdery mass may be carried out in many specifically different ways. One of these ways will now be described by way of illustration, but it will be understood that the invention is not restricted thereto.

Referring to the accompanying drawing, 1 represents the apparatus in which the grains or relatively coarser particles, of which the initial powdery mass is made up, are divided and broken open, so as to expose the interior portions thereof. This is preferably done by any of the well known mechanical devices capable of grinding, rubbing or breaking the particles of the mass. While edge runners, mortars and pestles, and the like could be employed, I prefer to use a pulverizer of the high speed rotary blade type, in which the charge is subjected to a large number of impacts repeated with great frequency. The repeated blows, to which the particles are subjected by the extremely rapidly moving blades, break them up into fine pieces. A "Raymond" pulverizer is an example of this type of mill. The powder to be treated may be charged in through the entrance 2. Apparatus 1 may be driven from any suitable source of power, here conventionally illustrated as a motor 3, joined by belt 4 to pulley 5 of the apparatus.

The fluid vehicle, such as air, charged with vapors of acetic values during its passage through apparatus 1, moves through the pipe 6 to the removal station 7, which may be any one of the known absorbing or condensing units employed for this purpose. The gas, freed from a considerable portion of the vapors of acetic values, next passes through pipe 8, being moved by any suitable form of blower or impeller 9 driven, for example, through any suitable means, here illustrated as pulley 10 and belt 11, coacting with pulley 12 of motor 3. The gas is preferably warmed by any suitable heating unit 13 before it passes through pipe 14 to apparatus 1. It will thus be seen that the gas passes through the same cycle repeatedly, thereby avoiding loss into the atmosphere of residual vapors of acetic values not removed at station 7, if the gas were discharged after leaving station 7 instead of being recirculated. If station 7 takes the form of a condenser, it is convenient to keep it at a temperature around 60° F., for example, too low a temperature tending to solidify the acetic acid and choke the system. The temperature in apparatus 1, however, is conveniently kept at 80 to 85° F., and heating unit 13 may be used to bring the cooled air back to such proper temperature. Of course, the temperatures mentioned above are merely illustrative and subject to adjustment, as will be understood by those skilled in the art. Where rapidly moving beating blades are used in apparatus 1, a thorough intermixture of the gaseous vehicle and the broken particles is readily obtained. Any suitable dust-trapping apparatus may be used to prevent the fine particles from passing out into pipe 6.

Having thus described my invention, what I claim as new and desire to secure by Letters Patent is:

1. In the process of making cellulose acetate which includes recovering acetic values from a cellulose acetate mixture which is in the form of relatively coarse particles containing insufficient of said values to cause said particles to coalesce, at room temperature and pressure, the steps of breaking up said particles into powder of relatively finer particles, passing a fluid vehicle into contact with said broken up particles to absorb acetic values, removing said vehicle from said particles and separating acetic values from said vehicle.

2. In the process of making cellulose acetate which includes the preparation of a cellulose acetate mixture in the form of relatively coarse particles containing acetic values in quantities insufficient to cause said particles to coalesce at room temperature and pressure, the steps of mechanically breaking open said particles to form a powder of relatively finer particles, thereby exposing interior portions of said first named particles, and passing a gaseous vehicle through said broken particles to carry away vapors of acetic values therefrom.

3. In the process of recovering acetic acid from a cellulose acetate mixture which is in the form of relatively coarse particles having on their outer surfaces insufficient acetic acid to cause them to coalesce at room temperature and pressure, the steps of mechanically breaking up said particles to form a powder of relatively finer particles, thereby exposing interior surfaces of said first named particles, passing air into contact with said broken up particles to take up and carry away acetic acid vapors and separating acetic acid from said air.

4. In the process of manufacturing cellulose acetate the steps of further pulverizing by violent impacts a powder comprising substantially separate particles of a mixture of cellulose acetate and acetic acid, passing air through the pulverized particles to take up acetic acid, and separating acetic acid from said air.

5. In the process of manufacturing cellulose acetate which includes the preparation of a cellulose acetate mixture in the form of relatively coarse particles containing acetic values in quantities insufficient to cause said particles to coalesce at room temperature and pressure, the steps of breaking up said particles into finer particles and repeatedly circulating a gaseous vehicle through said broken particles to take vapors of acetic values, and through a removal zone for removing acetic values from the vehicle.

Signed at Rochester, New York, this 26th day of March, 1924.

PAUL C. SEEL.